E. B. KILLEN.
RUBBER TIRE AND ITS ATTACHMENT TO WHEELS.
APPLICATION FILED FEB. 5, 1920.
1,435,531.
Patented Nov. 14, 1922.
2 SHEETS—SHEET 1.
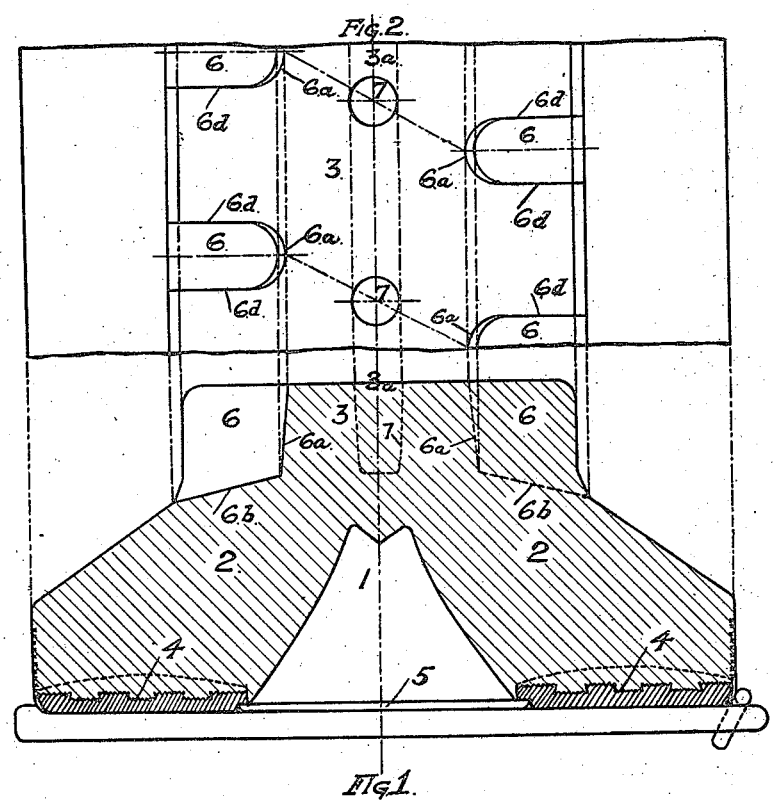
Inventor-
Edward Brice Killen.
By- B. Singer,
Atty.

E. B. KILLEN.
RUBBER TIRE AND ITS ATTACHMENT TO WHEELS.
APPLICATION FILED FEB. 5, 1920.
1,435,531.
Patented Nov. 14, 1922.
2 SHEETS—SHEET 2.
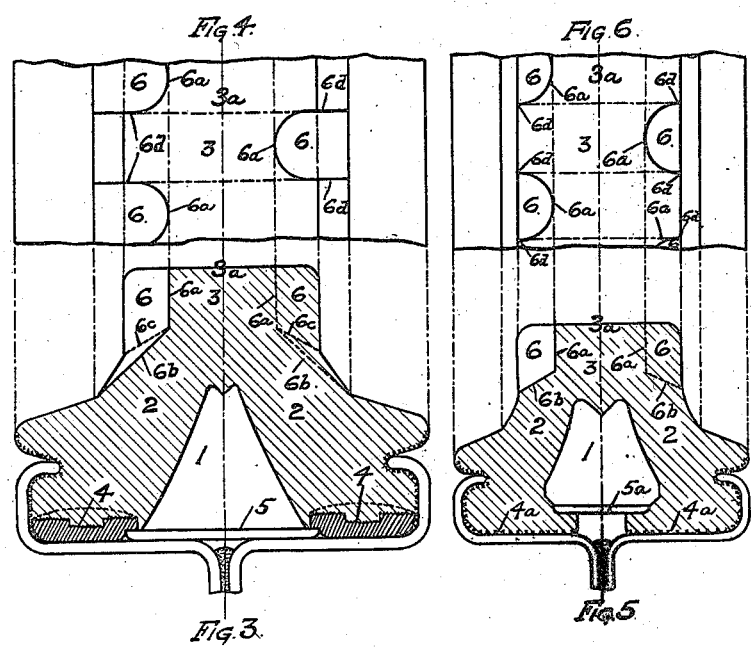

Patented Nov. 14, 1922.

1,435,531

UNITED STATES PATENT OFFICE.

EDWARD BRICE KILLEN, OF LONDON, ENGLAND.

RUBBER TIRE AND ITS ATTACHMENT TO WHEELS.

Application filed February 5, 1920. Serial No. 356,510.

*To all whom it may concern:*

Be it known that I, EDWARD BRICE KILLEN, of 27 Queen Victoria Street, London, E. C. 4, England, have invented certain new and useful Improvements in or Relating to Rubber Tires and Their Attachment to Wheels, of which the following is a specification.

My invention relates to rubber tires and to means for attaching and detaching them to and from wheels, and particularly relates to tires of the type described in my earlier Patents Nos. 1209715 of 26th December 1916, 1225973 of 15th May 1917.

In order that my invention may be properly understood and readily carried into effect, I have hereunto appended two sheets of drawings, of which Figure 1 is a cross-section of a tire made in accordance with my invention having a supple upstanding tread and a metal base foundation airtightly attached to a rim or wheel.

Figure 2 is a plan of the tire tread shown in Figure 1.

Figure 3 is a cross-section illustrating a modified form of my invention.

Figure 4 is a plan of the tire tread shown in Figure 3.

Figure 5 is another cross-section of a modified form of my invention having an inextensible cord or fabric base foundation airtightly attached to the circumference of a divisible wheel.

Figure 6 is a plan view of the tire tread shown in Figure 5, all hereafter more fully referred to and described.

I construct the tire with a treading circumference which flattens much against the road surface circumferentially under load, but little laterally, and with an air core of such a shape that the rubber walls of the tire automatically thicken and spew internally with increase of load. I form the inner circumference of the tire practically inextensible, and so that the base of the tire may be fitted under great compression to a wheel or endless metal rim, or equivalent, in a manner somewhat similar to the way solid rubber band tires are rigidly fitted under great compression to their wheels.

The base or inner circumference of each tire wall may be a suitable endless metal rim or band formed with or without a hookable heel and the rubber of each tire wall may be attached in manufacture to each metal rim or band by means of vulcanite or in a manner somewhat similar to the way the rubber in solid rubber band tires is attached to their endless metal base bands, see Figure 1.

One object of this invention is to enable very resilient air cushion tires to be constructed and attached to heavy motor chassis which tires are capable of carrying a bus and its load of passengers safely for long distances without any risk of the tires bursting or of the bus being let down even when travelling at high speeds and another object is to manufacture the tire so that it may be airtightly attached under great compression to an endless metal rim or wheel, by means of its inextensible inner circumference.

In this invention the inner circumference of the tires may be constructed having suitable types of endless metal rims which enable the tires to be airtightly attached to metal rims or wheels under compression, and the large type of tire with its metal base part may be constructed capable of being fitted under compression to say the same metal rim or wheel to which twin solid rubber band tires are attached, see Figure 1.

In this invention the walls of the tire do not stand upright under load but are abnormally distorted with increase of load, and the supple tread of the tire, see Figures 1, 2, 3, 4, 5 and 6, is preferably constructed to flatten much circumferentially against the road surface but little laterally, during its life.

The air chamber or core 1 within the tire may be made an airtight chamber mechanically by fitting the tire over its endless metal rim or wheel under compression without any risk of the airtight joints being destroyed during the tire's life.

The tire with its gable-like air core 1 is constructed of such a shape that its rubber walls 2 automatically thicken and spew first internally and then slightly externally with increase of load, without collapsing outwardly under heavy loads and without the tread, 3 when in road contact being practically increased in effective extreme width.

When the inner base circumference of each tire wall is constructed of metal 4, see Figures 1 and 3, the tire is capable of being manufactured to efficiently carry heavy axle loads and of being fitted under compression to heavy motor chassis in a manner somewhat similar to the way existing solid rubber band tires are fitted. Suitable circular distance pieces 5 and 5ª are preferably fitted within the tire before the tire is fitted to its metal rim or wheel, which distance pieces keep the walls of the tires in correct relative position to each other when fitting the tires under compression to their metal rims or wheels, see Figures 1, 3 and 5. These circular distance pieces may be constructed of metal or any suitable material and be snugly and suitably fitted within the air core lying suitably between the tire's base foundations, in a space prepared for their reception, see Figures 1, 3 and 5.

By means of this invention very resilient standard air cushion tires may be despatched from the manufacturer's works, having a metal inner circumference and a metal distance piece snugly fitted between the tire's base foundations, and be fitted practically anywhere by unskilled labour to a divisible type of wheel see Figure 3, by means of bolts and nuts or their equivalent or the tire may be fitted by means of a press over existing standard wheels from which solid rubber band tires have been detached, thereby enabling twin solid rubber band tires to be exchanged for one of my large wide tires, the tread of which has great shock-absorbing qualities, besides being a good-nonskid, see Figure 1.

For heavy commercial chassis work, I prefer that the inner circumference of each tire wall be manufactured having an inextensible metal base part capable of being fitted under great compression to a metal rim or wheel like existing solid rubber band tires, but for pleasure cars I preferably manufacture the inextensible base part of each rubber wall from inextensible woven cord or fabric with rubber 4ª or any other well-known material which enables the base part of each tire wall to be constructed practically inextensible and capable of being airtightly and efficiently clamped and fitted under great compression to a metal rim or wheel, see Figure 5.

Suitable deep spaces or cavities 6 are moulded on each side of the upstanding tread and these cavities are preferably constructed of sufficient depth to remain on each side of the treading circumference until the entire tread is worn away. These deep cavities 6 prevent grease and mud lying between the treading circumference of the tire and the road surface and enable the supple tread 3 of each tire to get into biting contact with the hard road surface, thereby forming a good non-skidding non-slipping tread on each tire, even when the tread of the tire is constructed wide to carry heavy loads, see Figures 1 and 2.

The endless comparatively narrow treading part 3ª is formed at each side of the centre line on the tire's extreme circumference and is of suitable width and which upstanding tread has deep cavities 6 formed at each treading side. These cavities 6 formed on each side of the tread of the tire's cross section are preferably constructed with side walls 6ᵈ. The inner ends of said cavities are semi-circular as at 6ª and their bases are inclined as at 6ᵇ. In addition to the cavities formed on each side of the treading circumference I may mould deep cavities 7 on the centre line of the tread when required which construction provides an effective supple and elastic non-skidding non-slipping tread during the life of the tire. A supple and elastic tread is thus obtained which enables a greater flat to be formed circumferentially in the tire in road contact under both light and heavy loads than can be obtained in tires made in accordance with my earlier Patents Nos. 1209715 of 26th December 1916, 1225973 of 15th May 1917, of similar dimensions, and it is well-known that the greater the circumferential flat obtained in road contact in any tire, all other things being equal, the greater are the shock absorbing qualities of the tire.

The rubber in the tire's upstanding tread 3 flows or spews when under load into the cavities prepared for its reception and allows the tread to flatten much circumferentially in road contact with increase of load by bringing more inches of tire tubing or tire wall into road contact circumferentially to carry the extra loads.

This construction of tread enables what I will call a supple upstanding comparatively wide non-skid tread of say 6 inches to be formed on a wide base tire of say 10 to 12 inches, which type of tire is capable of taking the place of twin solid rubber band tires for heavy buses or other types of heavy chassis without grease or mud lying between the tread of the tire and the hard road surface, see Figures 1 and 2.

The tires may be manufactured from say 4½ to 12 inches wide to carry loads from say 3 cwt. to 2 tons per tire, having the actual part of each tire abnormally supple besides being a non-skid.

These shock-absorbing air cushion tires with their inextensible inner circumference of metal or other suitable material may be standardized and airtightly fitted under compression to many types of metal rims or wheels and have a confined endless air-core within each tire under all working conditions and be held in position over their rims or wheels by great compression or they may be fitted in position over divisible wheels and clamped to the wheels, without, when fitted giving any trouble during their entire life, see Figures 1, 3 and 5.

The tire may be constructed in all required dimensions and shapes and of suitable materials to suit both light and heavy axle loads.

Claims:

1. A rubber tire having an annular air chamber of gable-like cross section which is not inflated, and an upstanding tread which is flat in cross section and does not vary substantially in width with increase of load, characterized in having inextensible base foundations which are arranged to be hermetically attached mechanically to a wheel, and having deep cavities formed at each side of the upstanding tread; which cavities are open at their outer ends, the tire having a narrow effective tread portion formed on and about its center line between the deep tread cavities, substantially at described.

2. A rubber tire having an annular air chamber of gable-like cross section which is not inflated, and an upstanding tread which is flat in cross section and does not vary substantially in width with increase of load, characterized in having inextensible base foundations which are airtightly attached mechanically to a wheel, and with deep cavities formed at each side of the upstanding tread, the tire having a narrow effective tread portion formed on and about its center line between the tread cavities, which construction allows a great compression or flat to be formed in the tread of the tire circumferentially when under light load and an abnormal compression or flat to be formed circumferentially when overloaded.

In testimony whereof I affix my signature in presence of two witnesses.

EDWARD BRICE KILLEN.

Witnesses:
JOHN LIDDLE,
JOHN TRAIN LIDDLE.